United States Patent
Eubanks

(10) Patent No.: US 8,302,372 B1
(45) Date of Patent: Nov. 6, 2012

(54) AUXILIARY TRIMMER FOR A LAWNMOWER

(76) Inventor: Jay Eubanks, Sanger, TX (US)

( * ) Notice: Subject to any disclaimer, the term of this patent is extended or adjusted under 35 U.S.C. 154(b) by 0 days.

(21) Appl. No.: 12/943,074

(22) Filed: Nov. 10, 2010

Related U.S. Application Data

(60) Provisional application No. 61/260,588, filed on Nov. 12, 2009.

(51) Int. Cl.
*A01D 34/00* (2006.01)
(52) U.S. Cl. .............. 56/12.7; 56/13.7; 56/16.9
(58) Field of Classification Search ............... 56/12.7, 56/13.5–13.8, 16.9
See application file for complete search history.

(56) References Cited

U.S. PATENT DOCUMENTS

| | | | | |
|---|---|---|---|---|
| 2,771,730 A | * | 11/1956 | True | 56/11.6 |
| 3,490,213 A | * | 1/1970 | Pinto | 56/16.9 |
| 3,668,845 A | * | 6/1972 | Parker | 56/11.6 |
| 3,782,085 A | * | 1/1974 | Parker et al. | 56/11.6 |
| 4,077,191 A | * | 3/1978 | Pittinger et al. | 56/12.7 |
| 4,453,372 A | * | 6/1984 | Remer | 56/13.7 |
| 4,478,028 A | * | 10/1984 | Dawson, Jr. | 56/16.9 |
| 4,642,976 A | * | 2/1987 | Owens | 56/16.9 |
| 5,167,108 A | * | 12/1992 | Bird | 56/13.7 |
| 5,303,532 A | * | 4/1994 | Phillips | 56/12.7 |
| 6,474,053 B1 | * | 11/2002 | Lund | 56/13.7 |
| 7,065,382 B2 | * | 6/2006 | Alanara et al. | 455/556.1 |

\* cited by examiner

*Primary Examiner* — Alicia Torres
(74) *Attorney, Agent, or Firm* — Kenneth L Tolar

(57) ABSTRACT

An auxiliary trimmer for a lawnmower includes a mounting plate removably fastened to a lawnmower deck. Attached to the mounting plate is a trimmer housing having a shaft extending therefrom. At a distal end of the shaft is a trimmer spool that is driven by the lawnmower blade with a series of belts and pulleys. On the rear surface of the trimmer housing is an adjustment ring having a plurality of notches thereon. A spring-biased latch on an end of the shaft releasably fits within any one of the notches on the adjustment ring to position the trimmer spool at a select angular orientation. A pivotal handle raises and lowers the trimmer spool to a desired elevation.

6 Claims, 2 Drawing Sheets

AUXILIARY TRIMMER FOR A LAWNMOWER

CROSS REFERENCE TO RELATED APPLICATIONS

This application is entitled to the benefit of provisional application No. 61/260,588 filed on Nov. 12, 2009, the specification of which is incorporated herein by reference.

BACKGROUND OF THE INVENTION

The present invention relates to an auxiliary trimmer for a lawnmower that eliminates the need for supplemental equipment such as weed trimmers and edgers.

DESCRIPTION OF THE PRIOR ART

When mowing a lawn, a worker must first use a lawnmower to cut larger areas and then use a weed trimmer to cut around obtrusive objects such as trees, fences, sidewalks and driveways. Operating and maintaining multiple tools are laborious, cumbersome and time-consuming tasks. Accordingly, there is currently a need for a more convenient, less burdensome means of mowing a lawn. The present invention addresses this need by providing an auxiliary trimmer attached to a mower deck that allows the operator to simultaneously mow and trim.

SUMMARY OF THE INVENTION

The present invention relates to an auxiliary trimmer for a lawnmower including a mounting plate removably fastened to a lawnmower deck. Attached to the mounting plate is a trimmer housing having a shaft extending therefrom. At a distal end of the shaft is a trimmer spool that is driven by the lawnmower blade with a series of belts and pulleys. On the rear surface of the trimmer housing is an adjustment ring having a plurality of notches thereon. A spring-biased latch on an end of the shaft releasably fits within any one of the notches on the adjustment ring to position the trimmer spool at a select angular orientation. A pivotal handle raises and lowers the trimmer spool to a desired elevation.

It is therefore an object of the present invention to provide an auxiliary trimmer that allows a user to trim while mowing a lawn.

It is another object of the present invention to provide an auxiliary trimmer for a lawnmower that eliminates the need for trimmers, edgers and other supplemental equipment when mowing a lawn.

Other objects, features, and advantages of the present invention will become readily apparent from the following detailed description of the preferred embodiment when considered with the attached drawings and the appended claims.

DESCRIPTION OF THE PREFERRED EMBODIMENT

Figure 1:
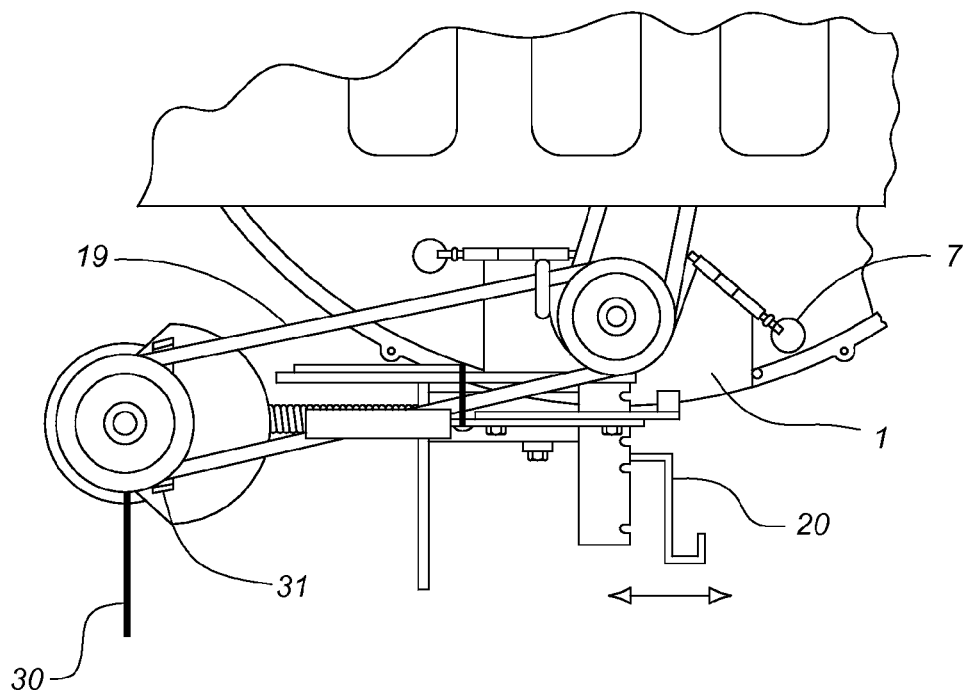
FIG. 1 is a top view of a lawnmower deck with the auxiliary trimmer according to the present invention mounted thereon.
Figure 2:
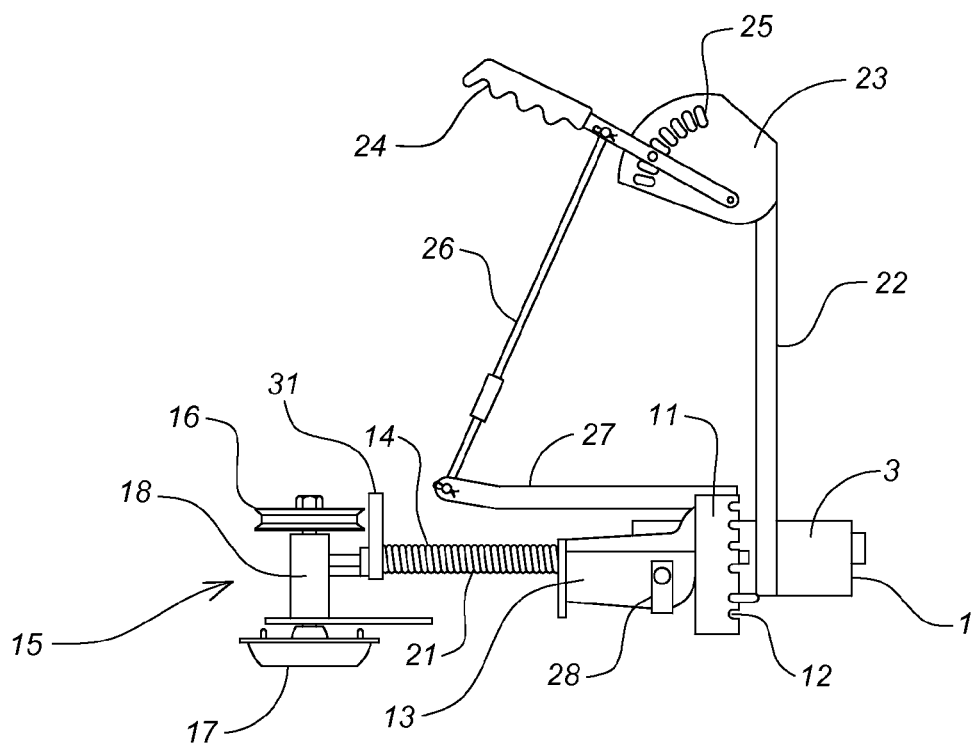
FIG. 2 is an isolated, side view of the auxiliary trimmer.
Figure 4:
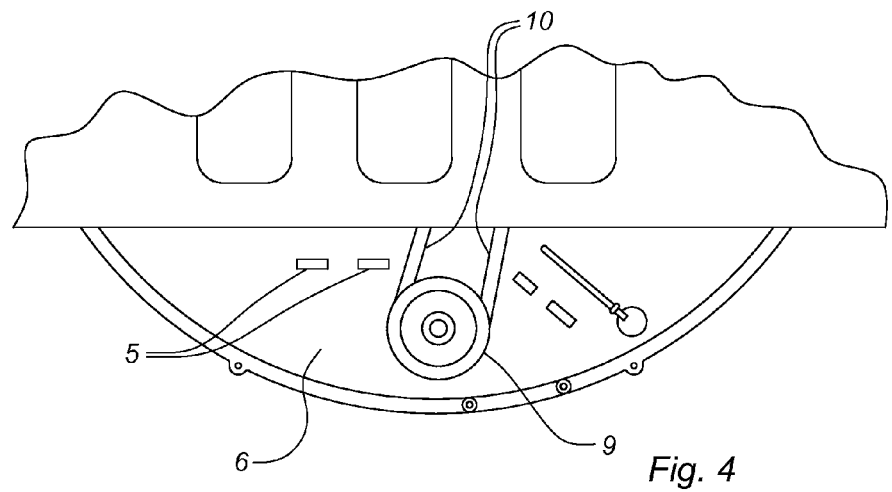
FIG. 4 is an isolated, top view of the mower deck of FIG. 1.
Figure 5:
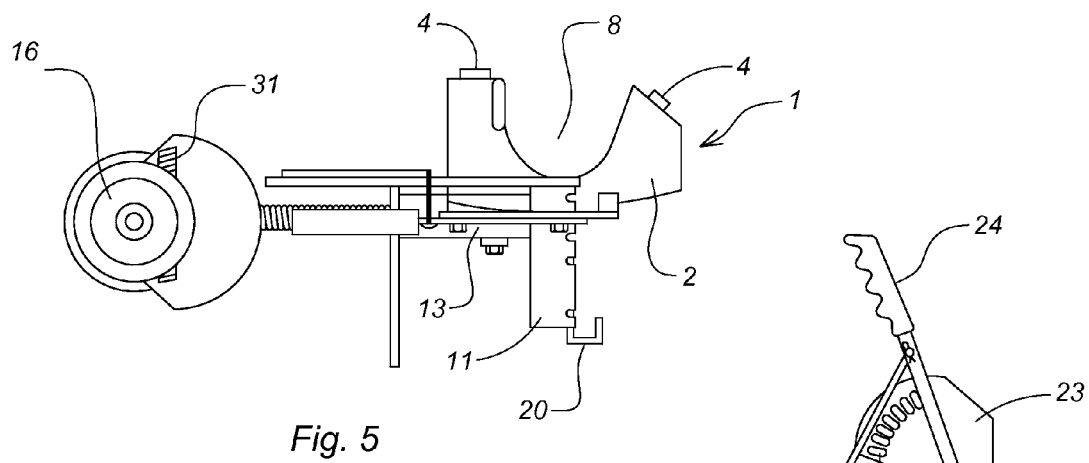
FIG. 5 is an isolated, top view of the auxiliary trimmer.
Figure 3:
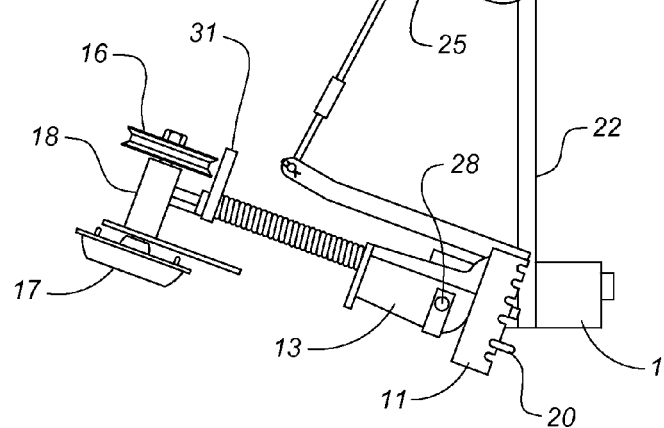
FIG. 3 is an isolated, side view of the auxiliary trimmer with the cutting head in a raised position.

The present invention relates to an auxiliary trimmer for a lawnmower comprising a mounting plate 1 having an upper surface 2 with a sidewall 3 vertically depending therefrom. The plate includes channels 4 that align with similar channels 5 on the upper surface of a mower deck 6; positive-grip locking pins 7 are inserted into the aligned channels to removably fasten the plate to the mower deck. The upper surface of the plate includes an arcuate indention 8 for accommodating a dual-spool pulley 9 on the deck; the pulley is operably connected to the mower blades with a drive belt 10.

Pivotally attached to the mounting plate is a trimmer housing 13 having a tubular receptacle with a shaft 14 rotatably received therein. On the rear end of the trimmer housing is an adjustment ring 11 having a plurality of notches 12 formed on a rear surface. At a distal end of the shaft 14 is a cutting head 15 including an upper drive pulley 16 and a lower base 17 with a trimmer-line 30 spool 18 therebetween. A second belt 19 encompasses the upper drive pulley 16 and one of the spools on the mower-blade pulley 9 so that the trimmer spool and mower blade rotate in unison. A guard 31 prevents the belt from dislodging from the pulley when in use.

Connected to a distal end of the shaft is a latch 20 that fits within any one of the plate notches to position the cutting head at a select angular orientation. A compression spring 21 surrounding the shaft normally biases the latch within the selected notch. Accordingly, a user can vary the angle of the cutting head relative to an underlying surface by pulling the latch, rotating it until the cutting head is at a desired angle and subsequently releasing the latch until it securely seats within an adjacent notch.

The device also includes an engage/disengage mechanism including a support rod 22 vertically extending from the attachment plate. A panel 23 at the upper end of the rod has a handle 24 pivotally attached thereto. A knob on an inner surface of the handle fits within any one of a plurality of apertures 25 on the panel to lock the handle at a select angular position. Depending from the handle is a pivotal, length-adjustable strut 26 having a lower end pivotally attached to an elongated lifting arm 27; a distal end of the lifting arm is fastened to the adjustment ring whereby lifting or lowering the handle pivots the trimmer housing about a fastener 28 to raise or lower the cutting head, respectively. Accordingly, a user can engage or disengage the head when trimming, or raise or lower it when edging.

To install the trimmer, a user secures the mounting plate to a lawnmower deck using the positive-grip locking pins; the lawnmower operator can easily adjust the height of the cutting head by simply pivoting the handle. Furthermore, the angle of the cutting head can also be adjusted allowing various surfaces to be trimmed while a lawn is being mowed.

The above-described device is not limited to the exact details of construction and enumeration of parts provided herein. Furthermore, the size, shape and materials of construction of the various components can be varied.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The invention claimed is:

1. In combination with a lawnmower having a deck superimposed on a rotatable mower blade, an auxiliary weed trimmer comprising:
a weed trimmer assembly attached to said deck, said weed trimmer assembly including a cutting head formed of a spool with a trimmer line wrapped thereabout, a housing having a tubular receptacle therein and a shaft extending from said cutting head and rotatably received within said tubular receptacle;

an adjustment ring attached to said housing, said ring having a plurality of notches formed thereon;

a biased latch attached to said shaft that releasably seats within any one of said notches to rotate the cutting head to a select angular orientation;

means for automatically rotating said spool and said mower blade to simultaneously mow a lawn and trim around an obstruction, wherein said means for automatically rotating said spool and said mower blade includes a first pulley attached to said cutting head, a second pulley attached to said deck, a third pulley attached to said mower blade, a first belt encompassing said first pulley and said second pulley, a second belt encompassing said second pulley and said third pulley and a motor means for rotating said mower blade;

a support rod fixedly attached to said deck, said rod having an upper end and a lower end;

a panel at the upper end of said rod, said panel having a handle pivotally attached thereto;

a lifting arm attached to said weed trimmer assembly; and a strut extending from said handle to said lifting arm whereby pivoting the handle lifts an end of said weed trimmer assembly.

2. The weed trimmer according to claim 1 further comprising means for locking said handle at a select angular position.

3. The weed trimmer according to claim 2 wherein said means for locking said handle at a select angular position comprises a knob on an inner surface of said handle that fits within any one of a plurality of apertures on said panel to lock the handle at a select angular position.

4. The weed trimmer according to claim 3 wherein said weed trimmer assembly further comprises:

a plate having at least a first channel thereon that is aligned with a second channel on the upper surface of said deck;

a locking pin inserted into said first channel and said second channel to removably fasten said weed trimmer assembly to said deck.

5. The weed trimmer according to claim 4 further comprising a guard attached to said cutting head and proximal said first belt to prevent said first belt from dislodging from said first pulley.

6. In combination with a lawnmower having a deck superimposed on a rotatable mower blade, an auxiliary weed trimmer comprising:

a weed trimmer assembly attached to said deck, said weed trimmer assembly including a cutting head formed of a spool with a trimmer line wrapped thereabout, a housing having a tubular receptacle therein and a shaft extending from said cutting head and rotatably received within said tubular receptacle;

an adjustment ring attached to said housing, said ring having a plurality of notches formed thereon;

a latch attached to said shaft that releasably seats within any one of said notches to rotate the cutting head to a select angular orientation, said latch biased with a spring surrounding said shaft;

means for automatically rotating said spool and said mower blade to simultaneously mow a lawn and trim around an obstruction.

\* \* \* \* \*